United States Patent
Lin et al.

(10) Patent No.: US 7,916,410 B1
(45) Date of Patent: Mar. 29, 2011

(54) LENS, METHOD FOR MAKING SAME, AND RELATED LENS MODULE

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/762,377

(22) Filed: Apr. 19, 2010

(30) Foreign Application Priority Data

Dec. 3, 2009 (CN) .......................... 2009 1 0310801

(51) Int. Cl.
*G02B 26/00* (2006.01)
(52) U.S. Cl. ....................................... 359/819; 359/365
(58) Field of Classification Search .................. 359/819
See application file for complete search history.

(56) References Cited

U.S. PATENT DOCUMENTS

| 2008/0123204 A1* | 5/2008 | Lin ............................... 359/829 |
| 2009/0002853 A1* | 1/2009 | Yuan ............................. 359/819 |
| 2009/0168204 A1* | 7/2009 | Nishizawa et al. ........... 359/796 |

* cited by examiner

*Primary Examiner* — Jordan M. Schwartz
*Assistant Examiner* — James C Jones
(74) *Attorney, Agent, or Firm* — Raymond J. Chew

(57) ABSTRACT

A first sub-lens having two opposite first surfaces is provided. One of the first surfaces has a central bulged first optical surface for refracting light rays passing therethrough and defining a first optical axis. The other first surface defines a recess that defines a flat bottom surface. A second sub-lens having two opposite second surfaces is provided. One of the second surfaces has a central bulged second optical surface for refracting light rays passing therethrough and defining a second optical axis. The other second surface is flat and substantially similar to the bottom surface of the first sub-lens in shape and size and is glued to the bottom surface of the first sub-lens in a manner that the first axis is coaxial with the second axis.

2 Claims, 3 Drawing Sheets

LENS, METHOD FOR MAKING SAME, AND RELATED LENS MODULE

BACKGROUND

1. Technical Field

The present disclosure relates to lenses and, particularly, to a lens, a method for making the lens, and a lens module having the lens. The lens has two precise coaxial optical surfaces.

2. Description of Related Art

Lenses are generally made by molding and include two opposite optical surfaces. To obtain high imaging quality, it is required that the two optical surfaces are strictly coaxial. However, it is difficult to machine a mold in which a lens made having two precise coaxial optical surfaces, limited to manufacturing precision.

Therefore, it is desirable to provide a lens, a method for making the lens, and a lens module having the lens, which can overcome the above-mentioned shortcomings.

BRIEF DESCRIPTION OF THE DRAWINGS

Many aspects of the present embodiments should be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure of the lens, method for making the lens, and lens module having the lens will now be described in detail with reference to the drawings.

Figure 1:
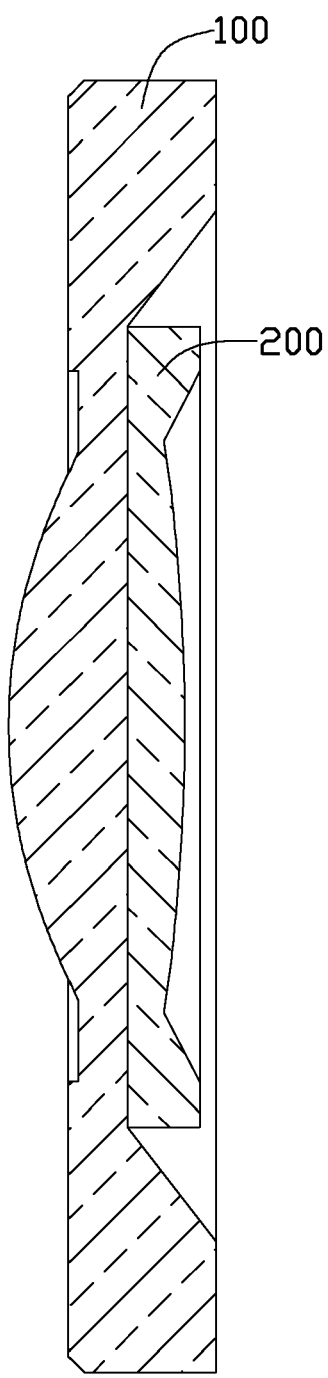
FIG. 1 is a cross-sectional, assembled view of a lens, according to one embodiment.

Referring to FIG. 1, a lens 10, according to one exemplary embodiment, includes two sub-lenses 100 and 200.

Figure 2:
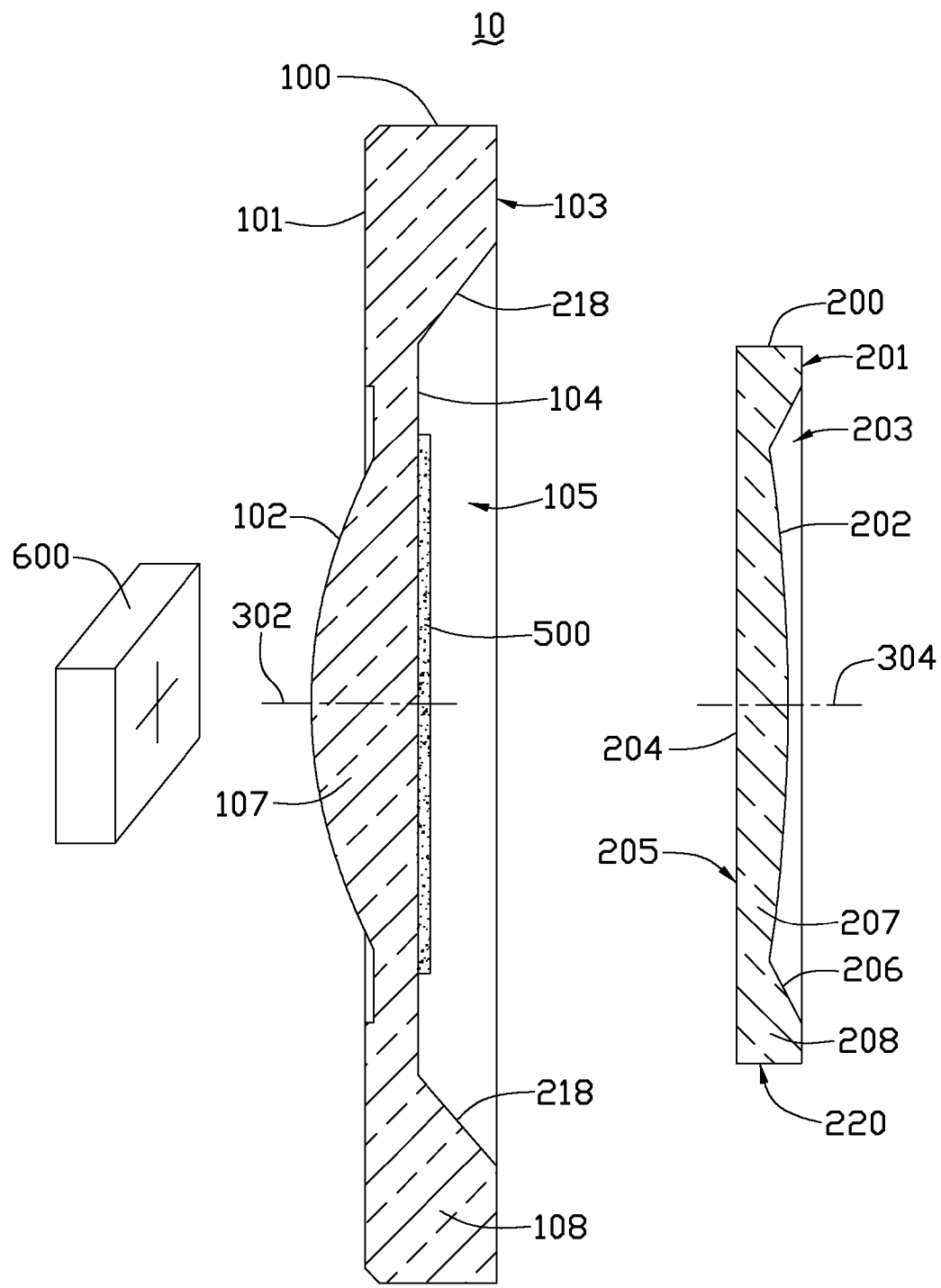
FIG. 2 is a cross-sectional, exploded view of the lens of FIG. 1.

Also referring to FIG. 2, the sub-lens 100 has an optical surface 102 and a flat combining surface 104 generally opposite to the optical surface 102. The optical surface 102 is predeterminedly curved (e.g., spherical or aspherical) for refracting light rays as desired and defines an optical axis 302. The optical surface 102 and the combining surface 104 cooperatively define an optical portion 107 of the sub-lens 100. In detail, the sub-lens 100 also has a non-optical portion 108 surrounding the optical portion 107. The non-optical portion 108 has two opposite side surfaces 101 and 103. The side surface 101 surrounds and connects the optical surface 102. The combining surface 104 is the bottom surface of a recess 105, which is defined in the side surface 103, and is surrounded by the side surface 103 and connects to the side surface 103 via a slant side surface 218 of the recess 105.

The sub-lens 200 includes an optical surface 202 and a flat combining surface 204 substantially opposite to the optical surface 202. The optical surface 202 is also predeterminedly curved for refracting light rays as desired and defines an optical axis 304. The optical surface 202 and the combining surface 204 defines an optical portion 207 of the sub-lens 200. The sub-lens 200 has a non-optical portion 208 surrounding the optical portion 207. The non-optical portion 208 has two opposite side surfaces 205 and 201. The side surface 205 is coplanar with the combing surface 204. The optical surface 202 are the bulged bottom surface of a recess 203, which is defined in the side surface 201, and is surrounded by the side surface 201 and connects to the side surface 201 via a slant side surface 206 of the recess 203. The side surface 205 has substantially the same shape and size of the combining surface 104.

To produce such the lens 10, the sub-lenses 100 and 200 first the lenses are made by molding. It is noteworthy that it is easier to machine molds for molding the sub-lenses 100 and 200, as compared to those for molding a lens having two opposite and strictly coaxial optical surfaces, since it is unnecessary to mold two strictly coaxial optical surfaces any more.

Then, curable glue 500 is applied to one of or both the combining surfaces 104 and 204. In this embodiment, the curable glue 500 is applied to the combining surface 104. The sub-lens 200 is placed in the recess 105 in a manner that the side surface 206 substantially coincides with and contacts the combining surface 104. The curable glue 500 is cured while positions of the sub-lenses 100 and 200 are adjusted to make the optical axes 302 and 304 coincide before the curable glue 500 is completely cured and with the assistance of a coaxial measurement monitor 50. The coaxial measurement monitor 50 can continuously measure and display the coaxial alignment of the lens 10 to provide basis for the adjustment of the sub-lenses 100 and 200. In practice, one of the sub-lenses 100 and 200 can be fixed in place, while the other is adjusted to archive the precise coaxial alignment of the lens 10. In this embodiment, the sub-lens 100 is immovably fixed and the sub-lens 200 is adjusted.

It is noteworthy that the orthogonal projection of the slant surface on the bottom surface of the recess 105 is outside the combining surface 104. As such, the sub-lens 200 can be fittingly located by the recess 105 by the alignment between the combining surface 104 and the combining surface 204. In the illustrated embodiment, the recess 105 is but should not limited to a conic recess.

Figure 3:
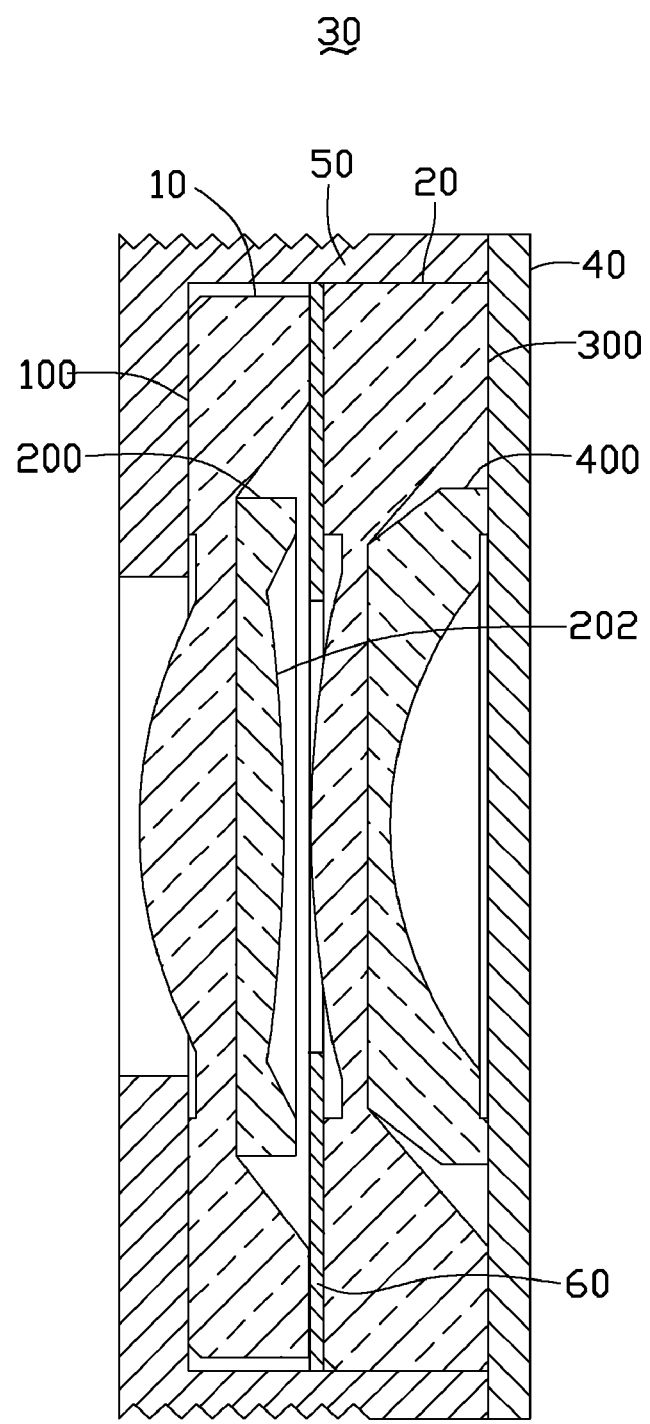
FIG. 3 is cross-sectional view of a lens module, according to another embodiment.

Referring to FIG. 3, a lens module 30, according to another embodiment, includes a lens barrel 50, the lens 10, a spacer ring 60, a lens 20, and an infrared filter 40. The lens 10, the spacer ring 60, the lens 20, and the infrared filter 40 are received in the lens barrel 50 in this order from the object-side end to the image-side end of the lens barrel 50. The lens 20 is substantially similar to the lens 10 and includes two sub-lenses 300 and 400. The lenses 10 and 20 cooperatively refract light rays incident in the lens barrel 50 into optical images. The spacer ring 60 is configured for spacing the lenses 10 and 20 with a predetermined distance. The infrared filter 40 is for filtering out infrared from the light rays.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A method for making a lens, comprising:

providing a first sub-lens and a second sub-lens; the first sub-lens including a recess defined therein, a flat bottom surface in the recess, and a first optical surface facing away from the bottom surface, the first optical surface portion defining a first optical axis; the second sub-lens being shaped so as to be fittingly received in the recess, the second sub-lens comprising a flat combining surface facing the bottom surface, the second sub-lens comprising a second optical surface substantially opposite to the combining surface, the second optical surface defining a second optical axis;

applying a layer of curable glue to the bottom surface of the recess or the combining surface;
placing the second sub-lens in the recess; and
curing the curable glue while adjusting one of or both the first sub-lens and the second sub-lens so that first optical axis is aligned with the second optical axis.

2. The method of claim 1, wherein curing and adjusting step is performed using a coaxial measurement monitor which is configured for measuring and displaying the coaxial alignment of the first optical axis and the second optical axis.

* * * * *